(12) United States Patent
Anagnos (10) Patent No.: US 9,062,793 B2
(45) Date of Patent: Jun. 23, 2015

(54) ACTUATORS FOR USE WITH FLUID CONTROL DEVICES HAVING MULTIPLE FLUID FLOW CONTROL MEMBERS

(75) Inventor: Richard James Anagnos, Conrad, IA (US)

(73) Assignee: FISHER CONTROLS INTERNATIONAL, LLC, Marshalltown, IA (US)

(*) Notice: Subject to any disclaimer, the term of this patent is extended or adjusted under 35 U.S.C. 154(b) by 244 days.

(21) Appl. No.: 13/570,877

(22) Filed: Aug. 9, 2012

(65) Prior Publication Data

US 2013/0037151 A1 Feb. 14, 2013

Related U.S. Application Data

(60) Provisional application No. 61/522,311, filed on Aug. 11, 2011.

(51) Int. Cl.
| | |
|---|---|
| *F16K 31/126* | (2006.01) |
| *F16K 31/165* | (2006.01) |
| *F16K 11/22* | (2006.01) |
| *F16K 31/12* | (2006.01) |
| *F15B 15/12* | (2006.01) |
| *F16K 11/20* | (2006.01) |
| *F15B 15/06* | (2006.01) |

(52) U.S. Cl.
CPC ............... *F16K 31/12* (2013.01); *F15B 15/12* (2013.01); *F16K 11/20* (2013.01); *F15B 15/063* (2013.01)

(58) Field of Classification Search
CPC ....... F16K 31/12; F16K 11/20; F15B 15/063; F15B 15/12

USPC ............. 137/613, 614.21, 628, 637.2, 637.3; 251/59

See application file for complete search history.

(56) References Cited

U.S. PATENT DOCUMENTS

| 147,065 | A | * | 2/1874 | Nutty ......................... 137/637.2 |
|---|---|---|---|---|
| 588,430 | A | * | 8/1897 | Hirt ............................ 137/637.2 |
| 682,453 | A | * | 9/1901 | Bunting ........................... 4/673 |
| 2,491,429 | A | * | 12/1949 | Thomas, Sr. ............... 137/637.3 |
| 2,638,120 | A | * | 5/1953 | Stenkvist et al. ........ 137/601.15 |
| 2,853,099 | A | * | 9/1958 | Eitel .......................... 137/527.2 |
| 3,595,270 | A | | 7/1971 | McNeal, Jr. |

(Continued)

OTHER PUBLICATIONS

European Patent Office, "Communication pursuant to Article 94(3) EPC," issued in connection with European Patent Application No. 12 748 119.0, issued on Dec. 12, 2014, 5 pages.

*Primary Examiner* — John K Fristoe, Jr.
*Assistant Examiner* — Seth W Mackay-Smith
(74) *Attorney, Agent, or Firm* — Hanley, Flight & Zimmerman, LLC (57) ABSTRACT

Actuators for use with fluid control devices having multiple fluid flow control members are disclosed. An apparatus includes a housing including a first chamber and a second chamber. The apparatus also includes a first actuator assembly at least partially positioned in the first chamber. The first actuator assembly includes a first stem to be coupled to a first flow control member of a valve. The first flow control member is to control fluid flow through a first flow aperture. The apparatus also includes a second actuator assembly at least partially positioned in the second chamber. The second actuator assembly includes a second stem to be coupled to a second flow control member of the valve. The second flow control member to control fluid flow through a second flow aperture, the first stem independently moveable relative to the second stem.

12 Claims, 6 Drawing Sheets

(56) References Cited

U.S. PATENT DOCUMENTS

| | | | | |
|---|---|---|---|---|
| 3,977,648 A | * | 8/1976 | Sigmon | 251/59 |
| 4,222,413 A | * | 9/1980 | Wulf | 137/637.3 |
| 4,485,010 A | * | 11/1984 | Strauss et al. | 209/500 |
| 4,655,252 A | * | 4/1987 | Krumhansl | 137/595 |
| 4,862,915 A | * | 9/1989 | Renfro | 137/556 |
| 5,094,270 A | * | 3/1992 | Reimert | 137/614.11 |
| 5,232,023 A | * | 8/1993 | Zimmerly | 137/637.2 |
| 5,247,964 A | * | 9/1993 | DeLange | 137/599.05 |
| 5,975,106 A | * | 11/1999 | Morgan et al. | 137/78.5 |
| 6,293,300 B1 | * | 9/2001 | Dumke et al. | 137/312 |

* cited by examiner

ACTUATORS FOR USE WITH FLUID CONTROL DEVICES HAVING MULTIPLE FLUID FLOW CONTROL MEMBERS

RELATED APPLICATION

This patent claims priority to U.S. Provisional Application No. 61/522,311 filed Aug. 11, 2011, which is hereby incorporated herein by reference in its entirety.

FIELD OF THE DISCLOSURE

This patent relates to actuators and, more specifically, to actuators for use with fluid control devices having multiple fluid flow control members.

BACKGROUND

Process control systems use a variety of field devices to control process parameters. In some instances, a single-acting and/or double acting actuator is used to control fluid flow through a valve.

SUMMARY

An example apparatus in accordance with the teachings of this disclosure includes a housing including a first chamber and a second chamber. The example apparatus includes a first actuator assembly at least partially positioned in the first chamber. The first actuator assembly includes a first stem to be coupled to a first flow control member of a valve. The first flow control member is to control fluid flow through a first flow aperture. The example apparatus also includes a second actuator assembly at least partially positioned in the second chamber. The second actuator assembly includes a second stem to be coupled to a second flow control member of the valve. The second flow control member is to control fluid flow through a second flow aperture. The first stem independently moveable relative to the second stem.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to example actuators for use with valves having multiple fluid flow control members (e.g., plugs). The example actuators may be used in connection with example three-way valves, example four-way valves or any other fluid control device that independently controls fluid flow using more than one fluid flow control member and/or controls fluid flow through multiple orifices. Because the examples described herein incorporate multiple actuating members in a single actuator body, the complexity and system length (i.e., pipe run length) of control systems incorporating the examples described herein may be reduced.

When the example actuators are used with example three-way valves and, specifically, rotary three-way valves, the actuator body may include separate chambers in which rotatable actuator assemblies are positioned. The chambers may be cylindrically shaped with a similar or different diameter and/or with similar or different heights. Rotary diaphragm plates (e.g., two plates) of the rotatable actuator assemblies may divide their respective chambers into a plurality of compartments (e.g., two compartments for each diaphragm plate), each of which may receive a diaphragm, air bag or actuating member. To independently move the rotary diaphragm plates and corresponding actuator stems, air and/or a control signal may increase pressure in some of the diaphragms and decrease pressure in other diaphragms, thereby urging the rotary diaphragm plate to move in a particular direction (e.g., clockwise, counterclockwise). Alternatively, edges or portions of the rotary diaphragm plates may slidably and/or sealingly engage inner surfaces of a corresponding chamber. To independently move the rotary diaphragm plates and corresponding actuator stems, air and/or a control signal may increase pressure in some of the compartments and decrease pressure in other compartments, thereby urging the rotary diaphragm plate in a particular direction (e.g., clockwise, counterclockwise).

In such examples, a first rotary diaphragm plate and its corresponding first actuator stem define apertures through which a second actuator stem extends to enable the second actuator stem to extend into the valve body (e.g., a rotary three-way valve). An adjustable valve packing may be positioned between a bonnet of the rotary valve and the first actuator stem and/or between the first and second actuator stems. The first actuator stem may be coupled to a first rotary valve plug that controls fluid flow through a first port and the second actuator stem may be coupled to a second rotary valve plug that controls fluid flow through a second port.

When the example actuators are used with example four-way valves, in addition to the two chambers in which the rotatable actuator assemblies are positioned, the actuator body may include a third chamber in which a sliding stem or linear piston assembly is positioned. Control signals may be applied to the linear piston to independently move the linear piston and the respective actuator stem to control fluid flow though a third port. A spring-return (e.g., single-acting) or another control signal (e.g., double acting) may be used to return the linear piston to a neutral or fail-safe position.

In such examples, a first rotary diaphragm plate and its corresponding first actuator stem may define apertures through which a second actuator stem extends to enable the second actuator stem to extend into a valve body. Additionally, the second rotary diaphragm plate and its corresponding second actuator stem define apertures through which a third actuator stem extends to enable the third actuator stem to extend into the valve body. The third actuator stem corresponds to the linear piston. An adjustable valve packing may be positioned between a bonnet of the valve and the first actuator stem, between the first and second actuator stems and/or between the second and third actuator stems. The first actuator stem may be coupled to a first rotary valve plug that controls fluid flow through a first port, the second actuator stem may be coupled to a second rotary valve plug that controls fluid flow through a second port and the third actuator stem may be coupled to a linear or sliding stem valve plug that controls fluid flow through a third port.

Figure 1:
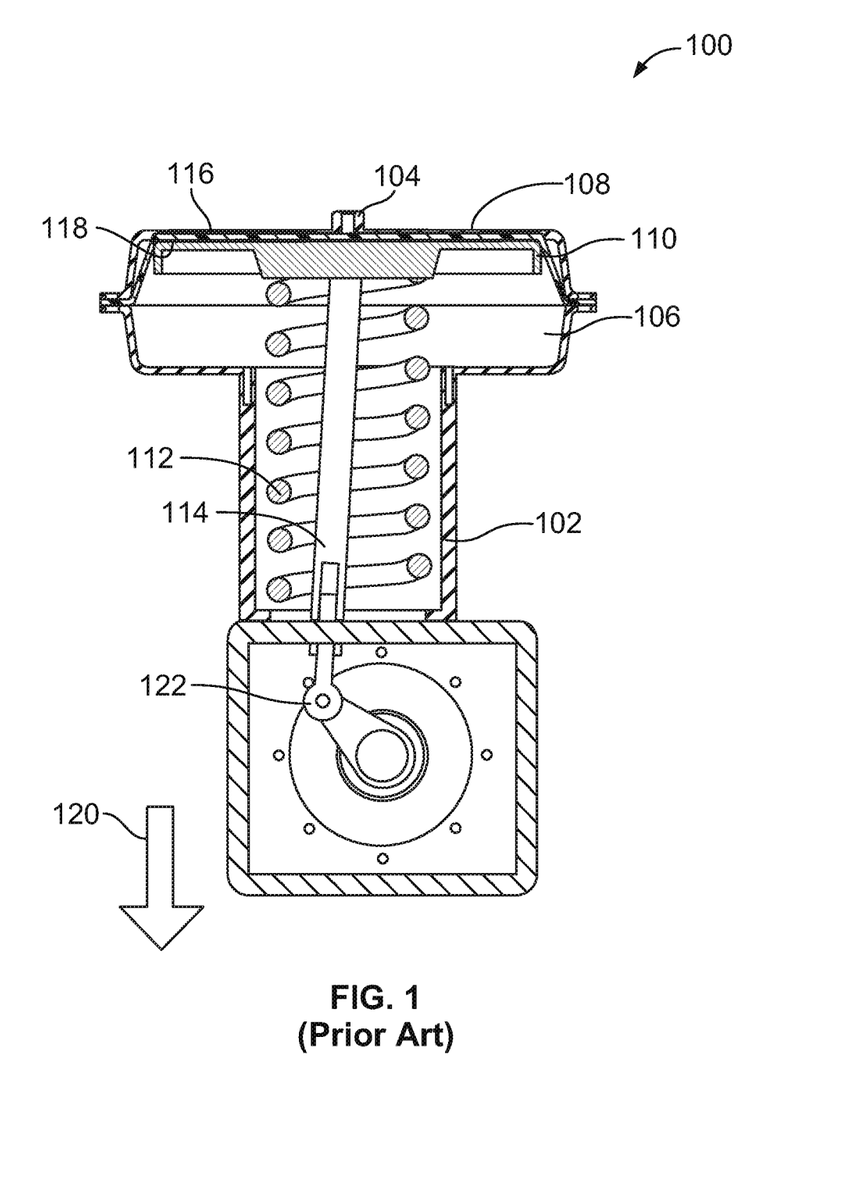
FIG. 1 depicts a known actuator.

FIG. 1 depicts a known rotary actuator 100. The actuator 100 includes a body 102 defining a port 104 to receive a supply pressure and/or control signal. The actuator 100 also includes a chamber 106 in which a diaphragm 108, a diaphragm plate 110, a spring 112 and an actuator stem 114 are at least partially positioned. In operation, a control signal received through the port 104 acts on a first side 116 of the diaphragm 108 and the spring 112 acts on a second side 118 of the diaphragm 108 via the diaphragm plate 110. If a force applied to the diaphragm 108 by the control signal is larger than the force applied to the diaphragm 108 by the spring 112, the actuator stem 114 is moved in a direction generally indicated by arrow 120 and a lever or linkage 122 coupled to the actuator stem 114 may be moved in a counterclockwise direction. However, if the force applied to the diaphragm 108 by the control signal is smaller than the force applied to the diaphragm 108 by the spring 112, the actuator stem 114 is moved in a direction generally opposite the direction indicated by arrow 120 and the lever 122 may be moved in a clockwise direction. Depending on the configuration of the valve to which the actuator 100 is coupled, moving the lever 122 in the clockwise direction may either increase or decrease fluid flow through the valve.

Figure 2:
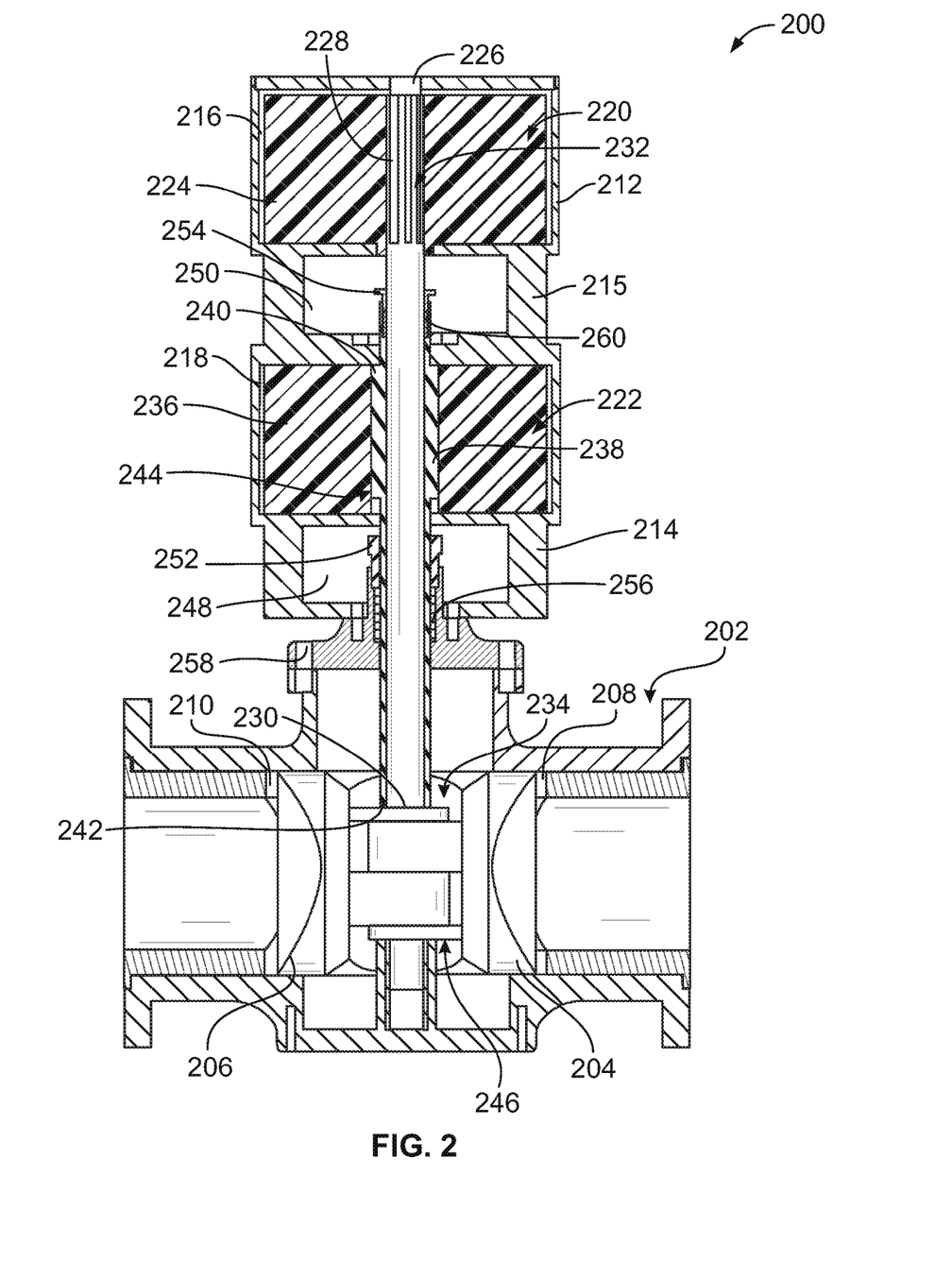
FIG. 2 depicts an example dual cylinder actuator coupled to an example three-way valve.

FIG. 2 depicts an example actuator 200 coupled to an example three-way valve 202. The example actuator 200 may be used to independently move first and second valve plugs 204 and 206 relative to respective orifices or seating surfaces 208 and 210 to control fluid flow therethrough. The actuator 200 includes a body 212 including a yoke 214 coupled to the valve 202 and a second yoke 215 coupled between first and second chambers 216 and 218 of the body 212. First and second rotary actuator assemblies 220 and 222 may be positioned in the first and second chambers 216 and 218, respectively.

The first actuator assembly 220 may include a first rotatable or rotary piston, diaphragm plate or vane 224 (more clearly shown in FIG. 3) that divides the first chamber 216 into a first compartment or chamber 302, a second compartment or chamber 304, a third compartment or chamber 306 and a fourth compartment or chamber 308. Diaphragms, air bags or actuating members 310-316 may be positioned in the compartments 302-308.

Figures 3, 4:
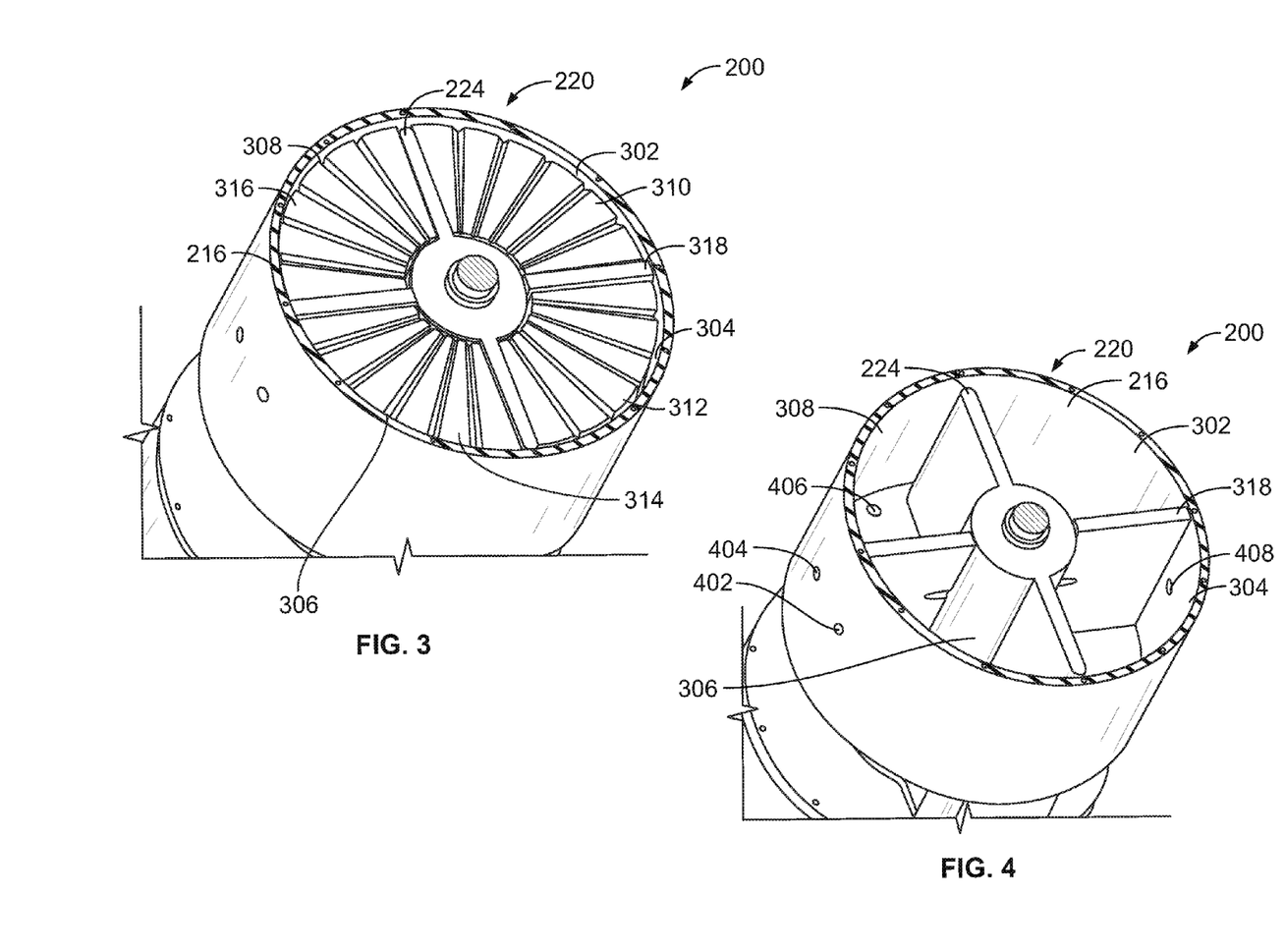
FIG. 3 depicts a cross-sectional view of one of the cylinders of the example actuator of FIG. 2 including example diaphragms.
FIG. 4 depicts a cross-sectional view of one of the cylinders of the example actuator of FIG. 2 with the example diaphragms removed.

To rotate the first rotary diaphragm plate 224, the diaphragms 310-316 may receive a control signal that increases and/or decreases pressure in the respective diaphragms 310-316, thereby urging the first rotary diaphragm plate 224 in a particular direction (e.g., clockwise, counterclockwise). More specifically, to rotate the first rotary diaphragm plate 224 in a counterclockwise direction, pressure within the diaphragms 312 and 316 is decreased and pressure within the diaphragms 310 and 314 is increased. Increasing the pressure in the diaphragms 310 and 314 causes the diaphragms 310 and 314 to expand and act against a divider 318 of the body 212 and the first rotary diaphragm plate 224. Because the divider 318 is stationary and/or fixed relative to the body 212, the force exerted by the expansion of the diaphragms 310 and 314 urges the first rotary diaphragm plate 224 in a counterclockwise direction. To rotate the first diaphragm plate 224 in a clockwise direction, pressure within the diaphragms 310 and 314 is decreased and pressure within the diaphragms 312 and 316 is increased. Increasing the pressure within the diaphragms 312 and 316 causes the diaphragms 312 and 316 to expand and act against the divider 318 and the first rotary diaphragm plate 224. Because the divider 318 is stationary and/or fixed relative to the body 212, the force exerted on the diaphragm plate 224 by the expansion of the diaphragms 312 and 316 urges the first rotary diaphragm plate 224 in a clockwise direction.

The first actuator assembly 220 may include a first actuator stem 226 that, at a first end 228, is coupled to the first rotary diaphragm plate 224 and, at a second end 230, is coupled to the second valve plug 206. In some examples, the first actuator stem 226 may include splines, protrusions, teeth or surface structures 232 and 234 that couple or mate with the first rotary diaphragm plate 224 and the second valve plug 206, respectively.

The second actuator assembly 222 may include a second rotatable or rotary piston, diaphragm plate or vane 236 that divides the second chamber 218 into compartments or chambers (not shown, but similar to the compartments 302-308) that may receive diaphragms, air bags or actuating members (not shown, but similar to the diaphragms 310-316). The second actuator assembly 222 may include a second actuator stem 238 that, at a first end 240, is coupled to the second rotary diaphragm plate 236 and, at a second end 242, is coupled to the first valve plug 204. In some examples, the second actuator stem 238 may include splines or surface structures 244 and 246 that couple or mate with the second rotary diaphragm plate 236 and the first valve plug 204, respectively.

The yokes 214 and 215 define apertures or openings 248 and 250 to enable access to and the adjustability of packing nuts 252 and 254. The packing nut 252 may engage (e.g., directly engage or operatively engage) a valve packing 256 positioned between a bonnet 258 of the valve 202 and the second actuator stem 238. The packing nut 254 may engage (e.g., directly engage or operatively engage) a valve packing 260 positioned between the first and second actuator stems 226 and 238. The second actuator stem 238 may surround at least a portion of the first actuator stem 226.

In operation, independent movement of the rotary diaphragm plates 224 and 236 is controlled via pressure differences between adjacent compartments (e.g., compartments 302-308) of the respective rotary diaphragm plates 224 and 236. More specifically, movement of the first rotary diaphragm plate 224 and, thus, the second valve plug 206, is controlled by flowing fluid (e.g., air, hydraulic fluid) into and out of the compartments 302-308 and/or the diaphragms 310-316. Likewise, movement of the second rotary diaphragm plate 236 and, thus, the first valve plug 204, is controlled by flowing fluid (e.g., air, hydraulic fluid) into and out of compartments and/or diaphragms (e.g., not shown, but similar to the compartments 302-308 and the diaphragms 308-316).

FIG. 3 depicts a cross-sectional view of the first chamber 216 and the first actuator assembly 220. As shown, the divider 318 and the first rotary diaphragm plate 224 divides the first chamber 216 into the compartments 302-308 into which the respective diaphragms 310-316 are positioned.

FIG. 4 depicts a cross-sectional view of the first chamber 216 and the first actuator assembly 220 with the diaphragms 310-316 removed. As shown, the body 212 may define a plurality of apertures or ports 402-408 to enable control signals to be received by the diaphragms 310-316 and/or to enable portions of the compartments 302-308 to be at atmospheric pressure, for example. While not shown, each of the compartments 302-308 may include one or more ports and/or vents.

Figure 5:
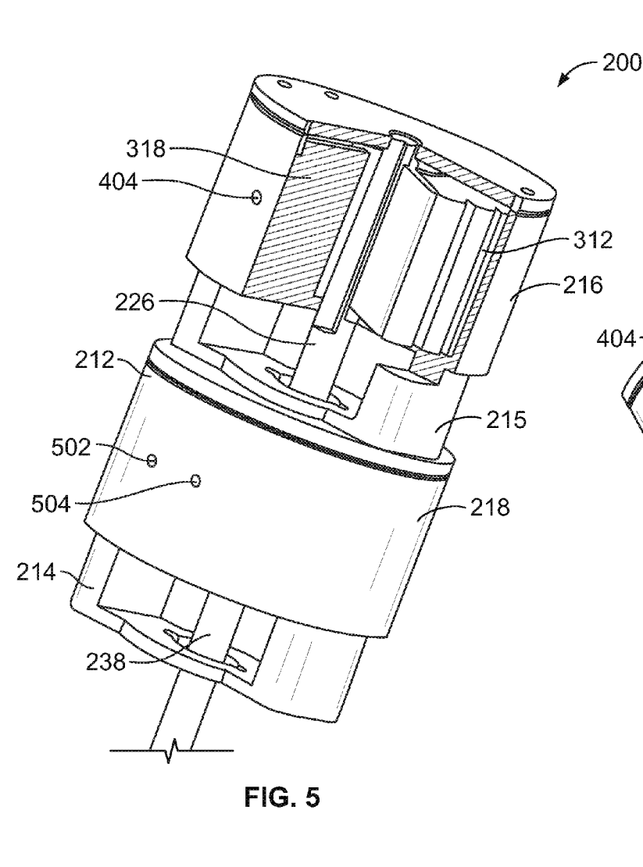
FIG. 5 depicts a perspective and partial cross-sectional view of the example dual cylinder actuator of FIG. 2.

FIG. 5 depicts a partial cross-sectional view of the example actuator 200. As shown, the second chamber 218 may define a plurality of apertures and/or ports 502 and 504 to enable control signals to be received by the diaphragms (e.g., 310-316) and/or to enable portions of the compartments (e.g., 302-308) to be at atmospheric pressure, for example. While not shown, each of the compartments of the second chamber 218 may include one or more ports and/or vents.

Figure 6:
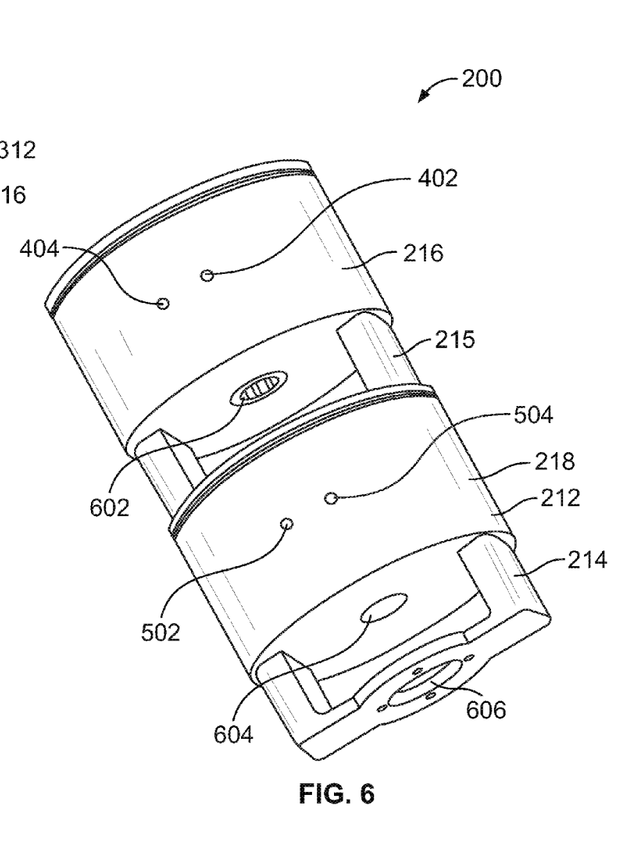
FIG. 6 depicts another perspective view of the dual cylinder actuator of FIG. 2.

FIG. 6 depicts a perspective view of the example actuator 200 including the apertures or ports 402, 404, 502 and 504. As shown, the body 212 defines apertures 602, 604 and 606 to enable the actuator stems 226 and 238 to extend into the chambers 216 and 218 and to the valve 202.

Figure 7:
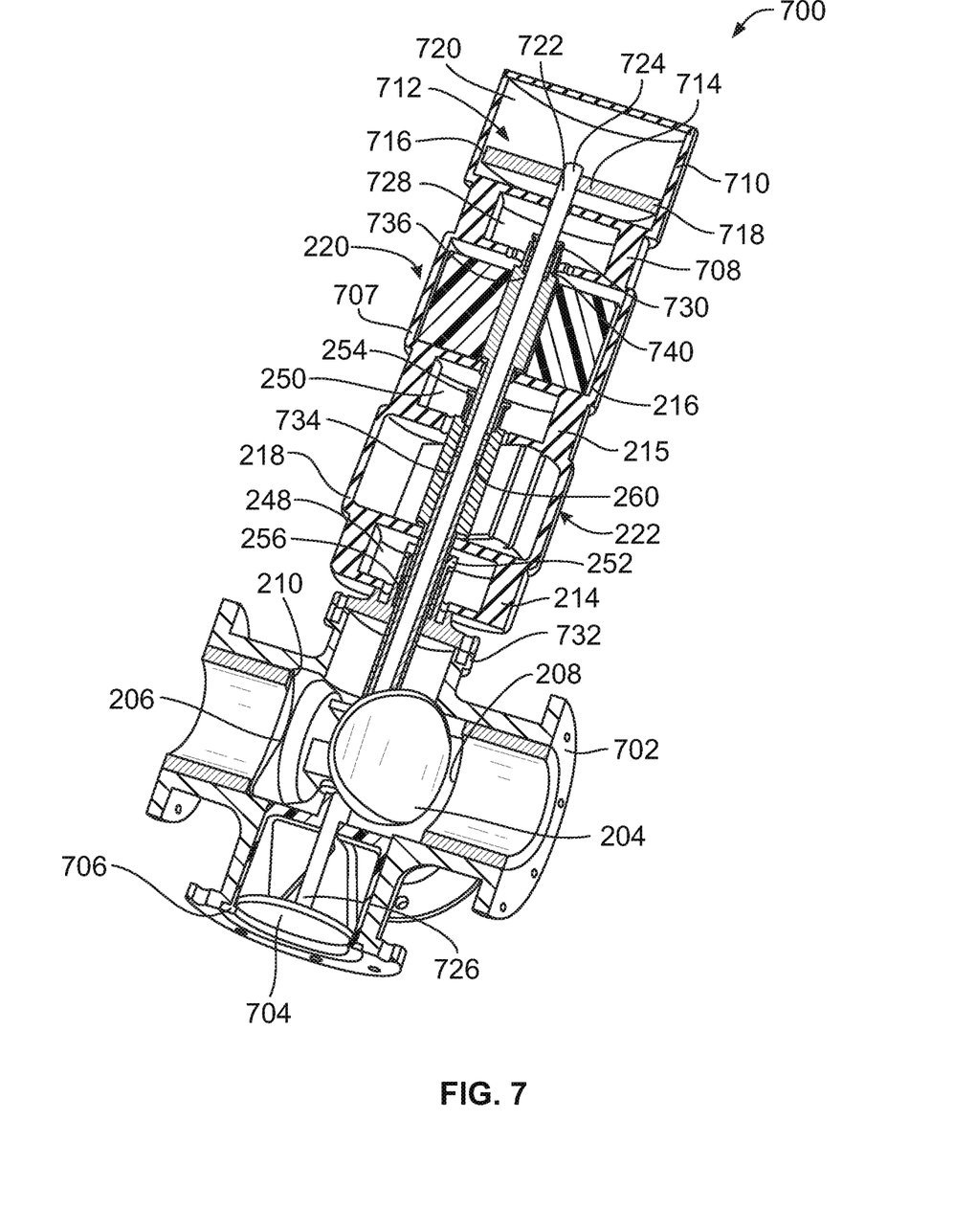
FIG. 7 depicts an example triple cylinder actuator coupled to an example four-way valve.

FIG. 7 depicts an example actuator 700 coupled to an example four-way valve 702. The example actuator 700 may be a rotary and linear actuator. In addition to independently moving the first and second valve plugs 204 and 206 relative to the seating surfaces 208 and 210, the example actuator 700 may also independently move a third valve plug 704 relative to a third orifice or seating surface 706. The valve plugs 204 and 206 may be rotary valve plugs and the valve plug 704 may be a linear valve plug. The actuator 700 includes a body 707 including the yoke 214 coupled to the valve 702, the second yoke 215 coupled between first and second chambers 216 and a third yoke 708 coupled between the second chamber 218 and a third chamber 710. The first and second actuator assemblies 220 and 222 may be positioned in the first and second chambers 216 and 218 and operate as discussed above in connection with FIG. 2 and a third piston assembly 712 may be positioned in the third chamber 710.

The third piston assembly 712 may include a linear or sliding stem piston 714 defining a groove 716 that receives a seal and/or O-ring 718 to enable sealing and/or sliding engagement with an inner surface 720 of the third chamber 710. The third piston assembly 712 also includes a third actuator stem 722 that, at a first end 724, is coupled to the piston 714 and, at a second end 726, is coupled to the third valve plug 704.

The yokes 214, 215 and 708 define apertures or openings 248, 250 and 728 to enable access to and the adjustability of packing nuts 252, 254 and 730. The packing nut 252 may engage (e.g., directly engage or operatively engage) a valve packing 256 positioned between a bonnet 732 of the valve 702 and a second actuator stem 734 of the second actuator assembly 222. The packing nut 254 may engage (e.g., directly engage or operatively engage) a valve packing 260 positioned between a first actuator stem 736 and the second actuator stem 734. The packing nut 730 may engage (e.g., directly engage or operatively engage) a valve packing 740 between the first actuator stem 736 and the third actuator stem 722. The second actuator stem 734 may surround at least a portion of the first and third actuator stems 736 and 722 and the first actuator stem 736 may be positioned between the second and third actuator stems 734 and 722.

Figure 8:
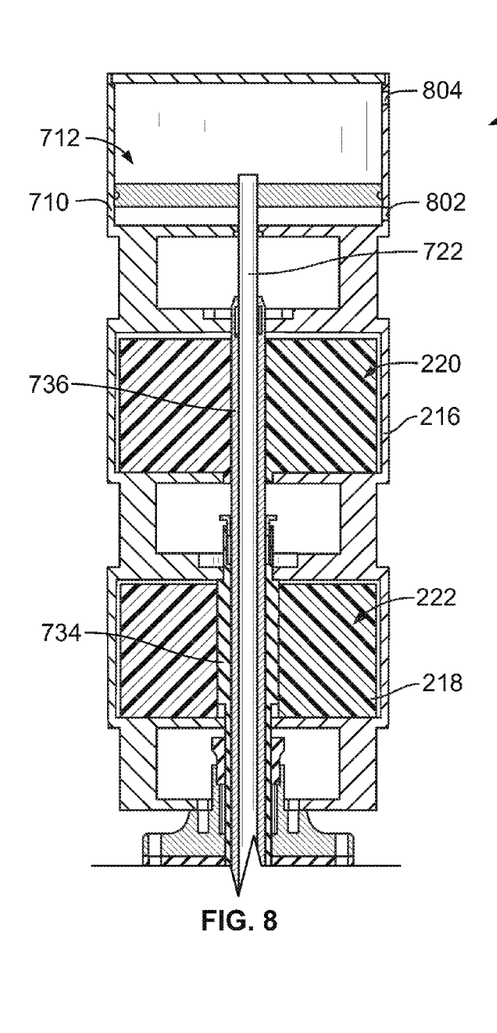
FIG. 8 depicts a cross-sectional view of the example triple cylinder actuator of FIG. 7.

FIG. 8 depicts a cross-sectional view of the actuator 700. As illustrated, the third chamber 710 defines ports 802 and 804 through which fluid (e.g., air, hydraulic fluid) is to flow to create a pressure difference across the linear piston 714. More specifically, movement of the piston 714 and, thus, the third valve plug 704, is controlled by flowing fluid (e.g., air, hydraulic fluid) into and out of the ports 802 and 804.

Figure 9:
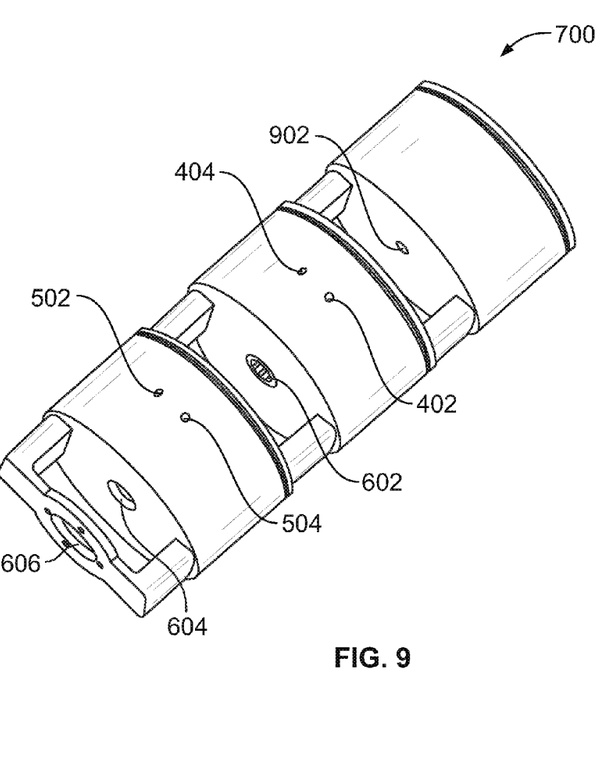
FIG. 9 depicts a perspective view of the example triple cylinder actuator of FIG. 7.

FIG. 9 depicts a perspective view of the example actuator 700 including the apertures or ports 402, 404, 502 and 504. As shown, the body 707 defines apertures 602, 604, 606 and 902 to enable the actuator stems 722, 734 and 736 to extend into the respective chambers 216, 218 and 710 and to the valve 202.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:
    a housing, comprising:
        a first chamber;
        a second chamber;
        a first yoke extending away from the first chamber;
        a second yoke disposed between the first and second chambers;
        a third chamber and a third yoke disposed between the second and third chambers;
    a first packing nut externally accessible through a first opening of the first yoke;
    a second packing nut externally accessible through a second opening of the second yoke;
    a first actuator assembly at least partially disposed in the first chamber, the first actuator assembly comprises a first stem to be coupled to a first rotary plug of a valve, the first rotary plug to sealingly engage a first inwardly facing seating surface to control fluid flow through a first flow aperture;
    a second actuator assembly at least partially disposed in the second chamber, the second actuator assembly comprises a second stem to be coupled to a second rotary plug of the valve, the second rotary plug to sealingly engage a second inwardly facing seating surface to control fluid flow through a second flow aperture, the first stem independently moveable relative to the second stem;
    a third actuator assembly at least partially disposed in the third chamber, the third actuator assembly comprising a third stem to be coupled to a third valve plug, the third valve plug to sealingly engage a third seating surface to control fluid flow through a third flow aperture, the third stem independently moveable relative to the first and second stems, the third flow aperture adjacent the first and second flow apertures; and
    a third externally accessible packing nut disposed in a third opening of the third yoke.

2. The apparatus of claim 1, wherein the first actuator assembly comprises a first rotary piston at least partially disposed in the first chamber.

3. The apparatus of claim 2, wherein the first stem comprises raised portions to couple the first stem to the first rotary piston.

4. The apparatus of claim 1, wherein the first stem defines an aperture through which at least a portion of the second stem is to extend to enable the second stem to be coupled to the second rotary plug.

5. The apparatus of claim 1, wherein the second actuator assembly comprises a second rotary piston at least partially disposed in the second chamber.

6. The apparatus of claim 1, wherein the first packing nut is to urge a valve packing between the first stem and the first yoke of the valve, the second packing nut is to urge another valve packing between the first stem and the second stem.

7. The apparatus of claim 1, wherein the first yoke is between the first and second chambers.

8. The apparatus of claim 1, wherein the first and second inwardly facing seating surfaces partially define a chamber in which the first and second rotary plugs are disposed.

9. The apparatus of claim 1, further comprising:
spaced first projections inwardly extending from the first rotary plug toward the first stem, the first projections to couple the first rotary plug to the first stem; and
a second projection extending inwardly from the second rotary plug toward the second stem, the second projection disposed between the first projections, the second projection to couple the second rotary plug to the second stem.

10. The apparatus of claim 1, wherein the third stem is to extend through the second stem.

11. An apparatus comprising:
a valve defining a first flow aperture and a second flow aperture, the first flow aperture comprising a first inwardly facing seating surface, the second flow aperture comprising a second inwardly facing seating surface;
wherein the valve comprises a three-way valve;
a first rotary actuator to be coupled to a first stem;
a second rotary actuator to be coupled to a second stem;
a first rotary plug to be coupled to the first stem, the first rotary plug to sealingly engage the first inwardly facing seating surface;
a second rotary plug to be coupled to the second stem, the second plug to sealingly engage the second inwardly facing seating surface, the second stem independently moveable relative to the first stem;
a first externally accessible packing nut disposed between the valve housing and the first actuator;
a second externally accessible packing nut disposed between the first actuator and the second actuator;
a third flow aperture of the valve adjacent the first and second flow apertures;
a third actuator to be coupled to a third stem, the third stem independently moveable relative to the first and second stems; and
a third plug to be coupled to the third stem, the third plug to sealingly engage a third seating surface.

12. An apparatus, comprising:
a valve defining a first flow aperture and a second flow aperture, the first flow aperture comprising a first inwardly facing seating surface, the second flow aperture comprising a second inwardly facing seating surface;
a first rotary actuator to be coupled to a first stem;
a second rotary actuator to be coupled to a second stem;
a first rotary plug to be coupled to the first stem, the first rotary plug to sealingly engage the first inwardly facing seating surface;
a second rotary plug to be coupled to the second stem, the second plug to sealingly engage the second inwardly seating surface, the second stem independently moveable relative to the first stem;
a first externally accessible packing nut disposed between the valve housing and the first actuator;
a second externally accessible packing nut disposed between the first actuator and the second actuator; and
a third yoke and a third externally accessible packing nut disposed between the second actuator and a third actuator.

* * * * *

UNITED STATES PATENT AND TRADEMARK OFFICE
CERTIFICATE OF CORRECTION

| | | |
|---|---|---|
| PATENT NO. | : 9,062,793 B2 | Page 1 of 1 |
| APPLICATION NO. | : 13/570877 | |
| DATED | : June 23, 2015 | |
| INVENTOR(S) | : Richard James Anagnos | |

It is certified that error appears in the above-identified patent and that said Letters Patent is hereby corrected as shown below:

In the Claims

In Column 7, line 24 (Claim 11): Replace "face;" with "face,"

Signed and Sealed this
Twenty-sixth Day of April, 2016

Michelle K. Lee
*Director of the United States Patent and Trademark Office*